PERRY L. KRUCKENBERG,
INVENTOR.

WHANN & McMANIGAL
Attorneys for Applicant

United States Patent Office
3,074,388
Patented Jan. 22, 1963

3,074,388
TWO-CYCLE CROSS-FLOW INTERNAL COMBUSTION ENGINE WITH FUEL INJECTION
Perry L. Kruckenberg, Los Angeles, Calif., assignor to McCulloch Corporation, Los Angeles, Calif., a corporation of Wisconsin
Filed Apr. 18, 1960, Ser. No. 22,932
9 Claims. (Cl. 123—32)

This invention relates generally to internal combustion engines and relates more particularly to two-cycle internal combustion engines of the cross-flow type.

While the invention has particular utility embodied in two-cycle internal combustion engines with fuel injection into the cylinder and spark ignition, and is shown and described in such connection, it is to be understood that its utility is not confined thereto. For example, the fuel injection arrangement of the present invention may also be embodied in a compression ignition engine.

In two-cycle engines having cross-flow cylinders the inlet air flow into and through the cylinders has been found to be somewhat laminor and that as the fuel is injected into the cylinders the first of the charge to enter leaves through the exhaust ports at the end of the scavenging period and approximately 3/10 of the air supplied this type of cylinder passes through unused.

It is therefore an object of the present invention to provide a cross-flow type of two-cycle engine in which the difficulty mentioned in the next preceding paragraph is overcome.

In the past, as far as applicant is aware, efforts to use fuel injection through a cylinder head into a cross-flow two-cycle engine cylinder have been only partially successful. The chief difficulty encountered has been that of nonuniform mixing of fuel and air. Direct evidence of this is the shortage of power over a carbureted engine and only moderate gains in economy.

It is therefore another object of the invention to provide fuel injection for a cross-flow two-cycle engine having uniform mixing of fuel with the air in the cylinder or cylinders.

Still another object of the invention is to provide an engine of this character wherein there is a specific distribution of the injected fuel into the air in the combustion chamber.

It is a further object of the invention to provide an engine of this character having a deflector wall on the head of each piston and fuel injection arrangement where the fuel spray is prevented from impinging on the deflector walls by the influence of the inlet air coming from the intake ports and traveling up along said deflector wall so that complete mixing of the fuel is accomplished.

It is a still further object of the invention to provide an arrangement of this character which will provide maximum fuel economy and power from a given engine at various loads.

It is another object of the invention to provide an arrangement of this character adapted to supply only the minimum fuel requirements for the maximum utilization of the trapped air at the end of the scavenging period.

Still another object of the invention is to provide an arrangement of this character wherein there is a saving in fuel, together with a gain in horse power.

A further object of the invention is to provide an engine of this character wherein the fuel in injected in generally the same direction as the directional flow of the inlet air.

A still further object of the invention is to provide an engine of this character wherein dripping of fuel from the injection nozzle is minimized or prevented.

Another object of the invention is to provide an arrangement of this character wherein the supply and control of air and fuel is effected with certainty and precision, whereby the engine will operate reliably and with great uniformity and efficiency throughout a wide range of speed and load variations.

The characteristics and advantages of the invention are further sufficiently referred to in connection with the following detailed description of the accompanying drawings, which represent one arrangement. After considering this example, skilled persons will understand that variations may be made without departing from the principles disclosed, and I contemplate the employment of any steps, structures, arrangements, or modes of operation that are properly within the scope of the appended claims.

Referring to the drawings, which are for illustrative purposes only:

FIG. 4 is a fragmentary sectional view taken on line 4—4 of FIG. 3; and

FIG. 5 is a timing diagram.

Figure 1:
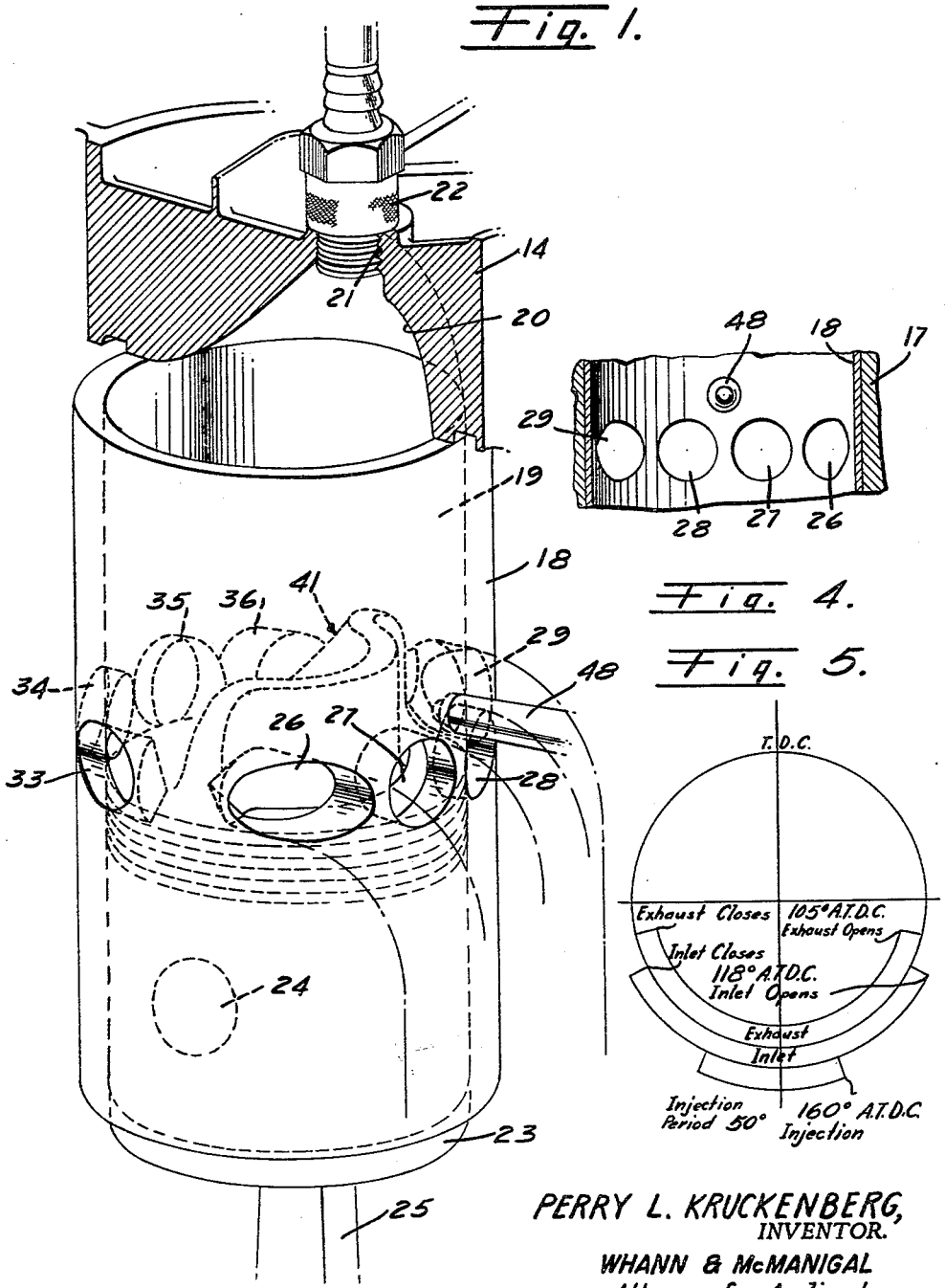
FIG. 1 is a perspective view of the cylinder of an engine embodying the present invention with a portion of the cylinder head shown in section, parts of the piston and inlet and outlet ports shown in dotted lines and the inlet ducts shown in phantom.

Referring more particularly to the drawings, there is shown an engine having a block 10 with a crankcase 12 at the lower end thereof, said crankcase being shown integral with the block. At the opposite end of the block there is a cylinder head 14 secured to the block in the usual well known manner, and between said cylinder head and block there is the usual gasket 16. The block has a cylindrical bore 17 in which is disposed a liner 18 which is secured in the bore 17 in the usual well known manner. It is to be understood that in some types of engines no liner is provided, but in the present disclosure the lining will be considered as defining a cylinder 19. The cylinder head 14 is provided with a combustion chamber 20 which communicates with the cylinder 19, the gasket 16 having an opening therein of substantially the same size as the adjacent part of the cylinder. There is also a tapped opening 21 in the cylinder head for reception of a spark plug 22, FIG. 1, for igniting the fuel mixture compressed in the combustion chamber 20 by a piston 23 which is reciprocably mounted in the cylinder 19.

Piston 23 is provided with a wrist pin 24 to which the upper end of a connecting rod 25 is connected in the usual well known manner. The opposite end, not shown, of the connecting rod 25, is connected to a crank shaft, not shown, in the crank case 12.

Cylinder 10 has a plurality of air inlet ports 26, 27, 28 and 29, respectively, arranged in a common plane normal to the axis of the cylinder 10 and also arranged through an arc of the cylinder at one side thereof, said inlet ports being spaced apart from each other arcuately relative to the cylinder. Air, under suitable pressure, is supplied to the inlet ports from any suitable source. In some engines of the two-cycle type the air is drawn into the crankcase of the engine when the piston moves upwardly or outwardly in its cylinder and this air is then compressed when the piston moves in the opposite direction and is conducted to the air inlet ports by means of an air intake manifold 30. Such an arrangement is well known in the art. Alternatively, air under pressure may be supplied to the inlet ports from an independent source of air such as a blower or compressor or the like. This alternative source of pressure is not shown.

Within the air intake manifold 30 there may be fins 31 which guide the air into the air inlet ports and into the cylinder in parallel streams.

At the opposite side of the cylinder, and arranged similarly to the air inlet ports, are a plurality of outlet or exhaust ports 33, 34, 35 and 36, respectively, which discharge into an exhaust manifold 38 which carries the exhaust gases to any suitable disposal point, as is well known in the art.

At the upper end of piston 23 said piston is provided with a piston head 40 and there is a flow deflector, indicated generally at 41, upstanding from the cylinder head 40. The deflector has end portions 42 which are in a vertical plane which extends diametrically of the piston head and hence the cylinder and through the axis of the wrist pin 24. There is an intermediate portion 43 of the deflector, which is arcuately shaped and has its ends merging into the inner ends of the portions 42. The intermediate portion 43 bulges toward the inlet ports. It is to be noted that the side of the intermediate portion 43 facing the inlet ports is concentric with the adjacent portion of the cylinder wall but is spaced therefrom. The side of the deflector facing the inlet ports defines, with the adjacent portion of the cylinder wall, an arcuate recess 45. It is to be noted that the deflector is shown herein as being integral with the piston head 40 although it is to be understood that it may be otherwise arranged.

Piston 23 is adapted to reciprocate in the cylinder 19 and when said piston is at the lower end of its stroke the air inlet ports and the exhaust ports are uncovered by said piston. When the piston moves upwardly in the cylinder it closes said inlet and exhaust ports and when it is at the upper end of its stroke the deflector 41 is received in the deepest part of the combustion chamber 20 which is formed so as to receive said deflector when the piston is at said upper end of its stroke.

Fuel is injected into the cylinder under pressure through a fuel discharge nozzle 48 which is received in a bore 49 provided therefor in the block 10. It is to be noted that the discharge nozzle 48 has its axis parallel to the axes of the air inlet ports and the axis of said nozzle intersects the axis of the cylinder 19 and piston 23. The nozzle 48 is disposed above the air inlet ports and midway of the arc through which said ports extend. It is to be understood that the nozzle is connected with any suitable type of fuel injection pump, not shown, adapted to supply fuel to the nozzle at intervals arranged in timed relationship to the position of the piston in the cylinder. Such fuel injection pumps are known in the art.

The nozzle 48 has two or more discharge openings at diametrically opposite sides for discharging separate sprays of fuel into the cylinder, said sprays being indicated at 50. It is to be noted that the sprays 50 are directed toward the deflector.

When the engine is in operation air for the fuel mixture is introduced into the cylinder when the piston is at the lower end portion of its stroke, at which time the inlet ports are uncovered. It is to be noted that the exhaust ports are also uncovered when the piston is at the lower end portions of its stroke and said exhaust ports are uncovered slightly before the time that the inlet ports are uncovered. When the piston is at said lower end portion of its stroke the deflector 41 is interposed between the inlet ports and the exhaust ports and the incoming air is directed against the adjacent inclined face of the deflector 41 and directed upwardly in the cylinder and into the combustion chamber 20. At the same time the burnt gases from a previous cycle of the engine are exhausted through the exhaust ports and into the exhaust manifold, the air delivered into the cylinder serving to force the exhaust gases out of the cylinder through the exhaust ports and to scavenge the cylinder of said exhaust gases.

Figure 2:
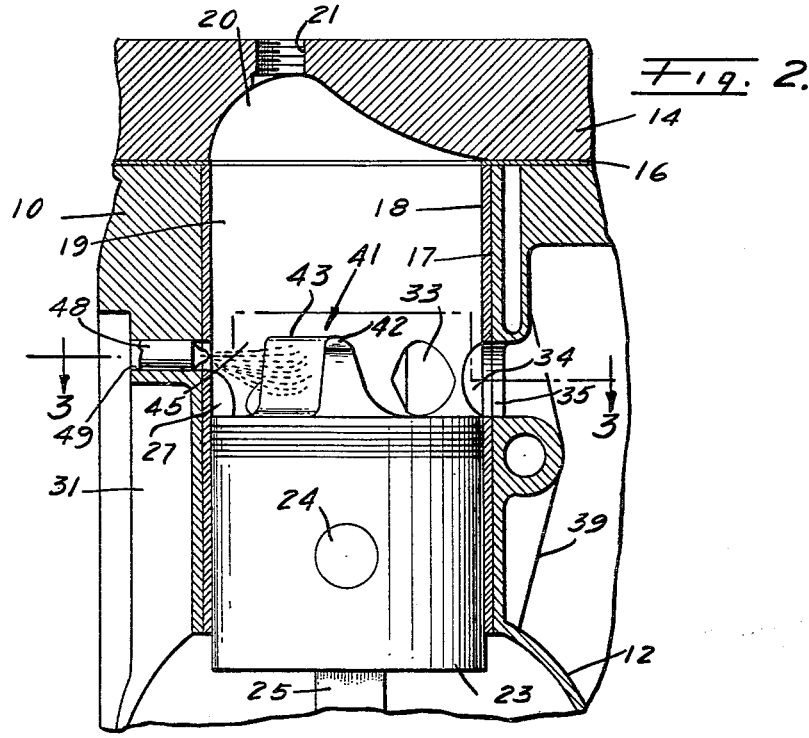
FIG. 2 is a longitudinally sectional view of an engine cylinder with the piston operatively disposed therein and also showing the fuel injection nozzle.
Figure 3:
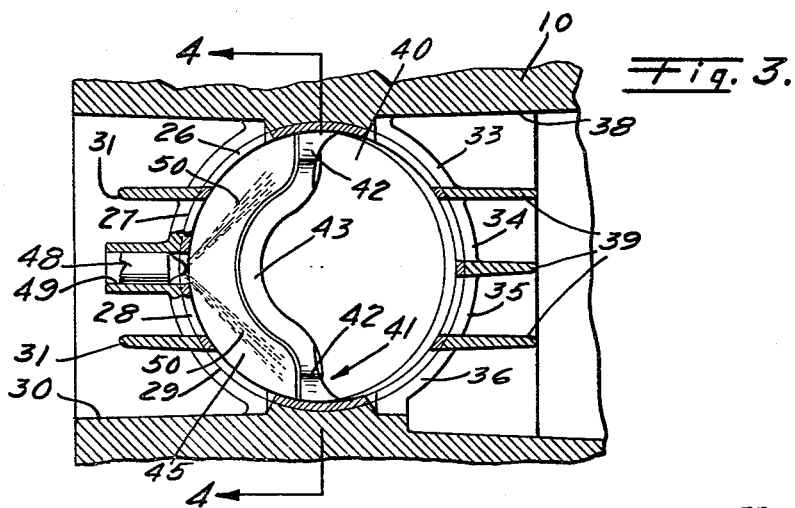
FIG. 3 is a sectional view taken on line 3—3 of FIG. 2.

As the air is delivered into the cylinder and deflected upwardly by the deflector the fuel injection pump delivers fuel to the nozzle 48 at the proper time, so that the sprays 50 are directed into the recess 45 when the piston is at the lower end portion of its down stroke, as viewed in FIGS. 1 and 2.

While the fuel delivered to the nozzle 48 is under substantial presure so that the sprays 50 from the nozzle have substantial force, the air entering the inlet ports strikes the adjacent face of the deflector and flows upwardly in the cylinder with such force as to carry upwardly into the cylinder 19 the atomized fuel of the sprays 50 at the end portions of the spray jet.

As the piston moves upwardly in the cylinder on the compression stroke the fuel is cut off from the nozzle 48 and the piston passes the inlet and exhaust ports so as to close same. Upon continued upward movement of the piston on its compression stroke the fuel mixture which has been formed and mixed in the recess 45 and carried upwardly into the sylinder and combustion chamber is compressed in the upper portion of the cylinder and in said combustion chamber. When the piston has reached its uppermost position the fuel mixture is fully compressed in the combustion chamber 20 and is then ignited by the spark plug which is supplied with current in the usual well known manner in timed relationship to the operation of the engine. The ignited fuel mixture expands and drives the piston downwardly. When the piston passes the upper edges of the exhaust ports the exhaust gases start to pass through said ports and increasing amounts of said exhaust gases pass through the ports as the piston moves downwardly through its power stroke. After the exhaust ports have begun to open air is supplied to the inlet ports and deflected upwardly into the cylinder 19 and combustion chamber 20 to scavenge the cylinder of exhaust gases. At the proper time the nozzle 48 is again supplied with fuel which is discharged in the sprays 50 as described hereinabove and the compression of the fuel mixture, ignition thereof, and exhaust of the exhaust gases is repeated.

FIG. 5 of the diagram shows the timing of the various parts of the engine cycles.

It is to be noted that the direction of the fuel jets is in the same general direction as the flow of air into the cylinder and into the stream or streams of inflowing air. Further, the fuel is injected closely adjacent to the air inlet or inlets.

It is to be noted that the tops of the exhaust ports are higher than the tops of air inlet ports, so that when the piston is descending the piston begins to uncover the exhaust ports before it begins to uncover the air inlet ports. Conversely, the air inlet ports are fully covered by the piston as it moves upwardly or outwardly in the cylinder before the exhaust ports are fully covered or closed by said piston. Hence, pressure in the cylinder is relieved by the opening of the exhaust ports when they are uncovered by the piston on its downward or inward stroke and scavenging of the exhaust gases from the cylinder is effectively achieved before the exhaust ports are closed as the pistons move upwardly or outwardly.

It is thought that the invention and many of its attendant advantages will be understood from the foregoing description and it is believed that it will be apparent that various changes may be made in the form, construction and arrangement of the parts of the invention without departing from the spirit and scope thereof or sacrificing all of its material advantages, the embodiment hereinbefore described being merely for purposes of illustration.

I claim:

1. A two-cycle internal combustion engine of the cross-flow type, including: means defining a cylinder having a plurality of air inlet ports arranged in a common plane normal to the axis of the cylinder and arranged through an arc of said cylinder at one side thereof, said inlet ports being spaced apart from each other arcuately, and a plurality of exhaust ports arranged in a similar manner to the inlet ports but at the opposite side of said cylinder, said exhaust ports having the upper sides thereof spaced upwardly relative to a plane of the upper sides of said inlet ports; a cylinder head closing the outer end of the cylinder and having a combustion chamber formed therein communicating with said outer end of said cylinder; air inlet passage means supplying air under pressure to said inlet ports; a piston reciprocably mounted in said cylinder and having movement between an outer position whereat the inlet and exhaust ports are covered and fuel mixture is compressed in the combustion chamber, and an inner position whereat said inlet and exhaust ports are uncovered; a deflector on the head of the piston, said deflector extending generally diametrically across the piston between the inlet ports and the exhaust ports, said deflector having outer generally radial portions and an intermediate portion arcuately bulging toward the inlet ports; parallel fins in the air inlet passage, said fins being positioned between the inlet ports for directing air in parallel streams into the cylinder and normally against the deflector when the piston has uncovered said inlet ports; a fuel discharge nozzle positioned above and adjacent to the inlet ports and midway of the arc of the cylinder in which said ports are located, said fuel nozzle having a pair of openings for directing fuel sprays toward the adjacent respective ends of the deflector independently thereof; and means for igniting fuel mixture compressed in a combustion chamber.

2. A two-cycle internal combustion engine of the cross-flow type, including: means defining a cylinder having a plurality of air inlet ports arranged in a common plane normal to the axis of the cylinder and arranged through an arc of said cylinder at one side thereof, said inlet ports being spaced apart from each other arcuately, and a plurality of exhaust ports arranged in a similar manner to the inlet ports but at the opposite side of said cylinder; a cylinder head closing the outer end of the cylinder and having a combustion chamber formed therein communicating with the outer end of said cylinder; an inlet passage means for supplying air to the inlet ports; a piston reciprocably mounted in said cylinder and having movement between an outer position whereat the inlet and exhaust ports are covered and fuel mixture is compressed in the combustion chamber, and an inner position whereat said inlet and exhaust ports are uncovered; a deflector on the head of the piston, said deflector extending generally diametrically across the piston between the inlet ports and the exhaust ports, said deflector having outer generally radial portions and an intermediate portion arcuately bulging toward the inlet ports; fins in the air inlet passage for directing air in parallel streams into the cylinder and against the deflector when the piston has uncovered said inlet ports; a fuel discharge nozzle positioned above the inlet ports, said fuel nozzle having a pair of openings for directing fuel sprays toward the adjacent respective ends of the deflector independently thereof; and means for igniting fuel mixture compressed in a combustion chamber.

3. In a two-cycle internal combustion engine of the cross-flow type; means defining a cylinder having a plurality of inlet ports at one side arranged through an arc of said cylinder at one side thereof, said inlet ports being spaced apart from each other arcuately for directing air into said cylinder in parallel streams, and a plurality of exhaust ports arranged in a similar manner to the inlet ports but at the opposite side of said cylinder; a cylinder head closing the outer end of the cylinder and having a combustion chamber formed therein; a piston reciprocably mounted in said cylinder and having movement between an outer position whereat the inlet and exhaust ports are covered and fuel mixture is compressed in the combustion chamber, and an inner position whereat said inlet and exhaust ports are uncovered; a deflector on the head of the piston, said deflector extending generally diametrically across the piston between the inlet ports and the exhaust ports, said deflector having outer generally radial portions forming with adjacent portions of the cylinder wall, pockets, an intermediate portion of said deflector arcuately bulging toward the inlet ports, air entering said inlet ports flowing against the deflector when the piston has uncovered said inlet ports; and a fuel discharge nozzle positioned adjacent the inlet ports, said fuel nozzle having a pair of openings for directing fuel sprays into said pockets.

4. In a two-cycle internal combustion engine of the cross-flow type: means defining a cylinder having a plurality of inlet ports at one side providing parallel streams of incoming air for said cylinder, said inlet ports being spaced apart from each other arcuately, and a plurality of exhaust ports arranged in a similar manner to the inlet ports but at the opposite side of said cylinder; a cylinder head closing the outer end of said cylinder and having a combustion chamber formed therein; a piston reciprocably mounted in said cylinder and having movement between an outer position whereat the inlet and exhaust ports are covered and fuel mixture is compressed in the combustion chamber, and an inner position whereat said inlet and exhaust ports are uncovered; a deflector on the head of the piston, said deflector extending generally diametrically across the piston between the inlet ports and the exhaust ports, when the piston is in said inner position, the side of the deflector facing the inlet ports defines, with the adjacent portion of the cylinder wall, arcuate recesses adjacent the ends of said deflector; air entering said inlet ports striking said deflector, which directs said air toward the outer end of the cylinder; and a fuel discharge nozzle positioned adjacent the inlet ports and directing fuel sprays toward the ends of the deflector and into said recess.

5. In an internal combustion engine: means defining a cylinder having a plurality of inlet ports at one side, said inlet ports being spaced apart from each other arcuately through which parallel streams of air enter said cylinder, and a plurality of exhaust ports arranged in a similar manner to the inlet ports but at the opposite side of said cylinder; a piston reciprocably mounted in said cylinder and having movement between an outer position whereat the inlet and exhaust ports are covered by said piston and fuel mixture is compressed thereby, and an inner position whereat said inlet and exhaust ports are uncovered by said piston; a deflector on the head of the piston, said deflector extending generally diametrically across the piston between the inlet ports and the exhaust ports when the piston is in said inner position; air entering said inlet ports striking said deflector which directs said air toward the outer end of the cylinder; and a fuel discharge nozzle positioned adjacent the inlet ports and directing fuel sprays toward the ends of said deflector.

6. In a combustion engine: means defining a cylinder having a plurality of inlet ports at one side through which parallel streams of air enter said cylinder, and a plurality of exhaust ports arranged in a similar manner to the inlet ports but at the opposite side of said cylinder; a piston reciprocably mounted in said cylinder and having movement between an outer position whereat the inlet and exhaust ports are covered by said piston and fuel mixture is compressed thereby, and an inner position whereat said inlet and exhaust ports are uncovered; a deflector on said piston, said deflector extending generally diametrically across the piston between the inlet ports and the exhaust ports, when the piston is in said inner position; air entering said inlet ports striking said deflector which directs said air laterally and also toward the outer end of the cylinder; and a fuel discharge nozzle positioned adjacent the inlet ports and directing a fuel jet toward the ends of said deflector.

7. In a two-cycle internal combustion engine of the cross-flow type: means defining a cylinder having inlet ports at one side through which parallel streams of air enter said cylinder, and at least one exhaust port at the opposite side of said cylinder; a cylinder head closing the outer end of said cylinder and having a combustion chamber formed therein; a piston reciprocably mounted in said cylinder and having movement between an outer position whereat the inlet and exhaust ports are covered by said piston and fuel mixture is compressed in the combustion chamber, and an inner position whereat said inlet and exhaust ports are uncovered thereby; a deflector on the head of the piston, said deflector extending generally diametrically of the piston between the inlet and exhaust ports, when the piston is in said inner position; air entering said inlet ports striking said deflector which directs said air laterally and toward the outer end of the cylinder; and a fuel discharge nozzle positioned adjacent the inlet port and directing fuel toward the ends of the deflector and generally in the same direction as the direction of flow of the inflowing air after same has struck said deflector.

8. In a two-cycle internal combustion engine of the cross-flow type: means defining a cylinder having a plurality of inlet ports at one side providing parallel streams of air into said cylinder, and at least one exhaust port at the opposite side of said cylinder; a piston reciprocably mounted in said cylinder and having movement between an outer position whereat the inlet and exhaust ports are covered by said piston, and an inner position whereat said inlet and exhaust ports are uncovered thereby; means carried by said piston for directing air from the inlet ports laterally thereof and upwardly in the cylinder; and a fuel discharge nozzle discharging fuel generally laterally in the cylinder in the same general direction as the lateral paths of air entering said cylinder.

9. In a two-cycle internal combustion engine of the cross-flow type: means defining a cylinder having a plurality of inlet ports at one side through which a plurality of parallel streams of air enter said cylinder, and at least one exhaust port at the opposite side thereof; a piston reciprocably mounted in said cylinder and having movement between an outer position whereat the inlet and exhaust ports are covered by said piston, and an inner position whereat said inlet and exhaust ports are uncovered thereby; a deflector carried by said piston, said deflector being between the inlet and exhaust ports when the piston is in said inner position, said deflector having end portions defining recesses with adjacent parts of the cylinder wall, air discharged by said inlet ports striking said deflector; and a fuel discharge nozzle positioned above and adjacent to the inlet ports and having a pair of openings for directing respective fuel sprays into said air streams and thence into said recesses independently of the deflector, said openings in said fuel nozzle being below the horizontal plane of the upper end of said deflector.

References Cited in the file of this patent

UNITED STATES PATENTS

| | | |
|---|---|---|
| 1,110,332 | Miller | Sept. 15, 1914 |
| 1,189,564 | Harper | July 4, 1916 |
| 1,798,105 | Palmer | Mar. 24, 1931 |

FOREIGN PATENTS

| | | |
|---|---|---|
| 24,337 of 1912 | Great Britain | Sept. 4, 1913 |
| 905,897 | France | Apr. 30, 1945 |